United States Patent

[11] 3,571,519

[72] Inventor John J. Tsimbidis
Cicero, Ill.
[21] Appl. No. 772,098
[22] Filed Oct. 31, 1968
[45] Patented Mar. 16, 1971
[73] Assignee Motorola, Inc.
Franklin Park, Ill.

[54] SYNCHRONOUS SUPERVISORY UNIT FOR MOBILE TELEPHONE SYSTEM
10 Claims, 13 Drawing Figs.

[52] U.S. Cl. ........................................ 179/41, 325/55, 325/64
[51] Int. Cl. ........................................ H04g 7/04
[50] Field of Search ........................................ 179/41 (A); 325/55, 64

[56] References Cited

UNITED STATES PATENTS 3,118,018 1/1964 Cornell et al. ................ 179/41
3,343,094 9/1967 Kocher ........................ 328/25
3,458,664 7/1969 Adlhoch et al. .............. 179/41

OTHER REFERENCES

Industrial Engineering, Ryder, John D., copyright 1957, 67 pp. 360— 364

*Primary Examiner*—Kathleen H. Claffy
*Assistant Examiner*—Jan S. Black
*Attorney*—Mueller and Aichele

ABSTRACT: A synchronous supervisory unit for mobile telephone operation is capable of assuming any one of a plurality of states depending upon the operations to be carried out by the supervisory system. A shift from one state to another occurs when certain predetermined conditions exist. A single oscillator provides a plurality of timing pulses to synchronize the operation of the system. A separate oscillator develops a plurality of tone signals for use in the telephone system.

Patented March 16, 1971 3,571,519

8 Sheets-Sheet 1

Inventor
JOHN J. TSIMBIDIS

BY Mueller, Aichele and Rauner

ATTYS.

Patented March 16, 1971 3,571,519

8 Sheets-Sheet 4

SYNCHRONOUS SUPERVISORY UNIT FOR MOBILE TELEPHONE SYSTEM

BACKGROUND OF THE INVENTION

Radiotelephone equipment has been provided to permit communication over regular telephone circuits with persons at remote points or in moving vehicles. In order to increase the flexibility of such equipment, provision has been made for operation of the equipment in a completely automatic manner so that the operator at the remote station need merely lift his handset and dial the desired number.

In present automatic telephone systems a plurality of channels are provided which are accessible to each of the remote stations. The remote stations monitor a single channel which is designated by an idle tone transmitted from the base station. When a channel is in use, the idle tone is shifted to another channel and all of the transmitters and receivers which are not currently being used at the remote stations shift to the new channel designated by the idle tone. This continues until all of the channels available are in use. Thus any of the remote stations can use any of the available channels to permit a greater flexibility than would be possible if each station were assigned to a particular channel.

The remote station equipment thus must be able to detect the designated idle channel, receive and transmit information concerning the telephone numbers which are to be contacted, and recognize its own telephone number and provide the proper signals in response to the received and transmitted information Electronic systems have been devised for carrying out these functions, however, present systems are implemented with discrete components. While the use of solid state devices, such as transistors, has permitted a reduction in size and power consumption of the present telephone system so that it may be carried in an automobile, it is desirable to further decrease the size of the equipment, increase its reliability and decrease the cost of manufacture. To accomplish this it is desirable to be able to use integrated circuits in place of the discrete components. Integrated circuit structure, particularly in the present state of the art consists mainly of digital circuits as analogue circuits are more difficult to manufacture. Further, digital circuitry provides a more precisely controlled system for better operation under adverse conditions. By using integrated circuits which are readily available, the cost of manufacture can be reduced since the number of components which are assembled and soldered can be reduced by a factor of four or five times. Also, increased use of mobile telephone service will permit the design of special integrated circuits in which large portions of the digital circuitry can be incorporated on a single integrated circuit chip, further reducing the cost of manufacture and size of the unit.

SUMMARY

It is, therefore, an object of this invention to provide an improved mobile telephone system which is readily adaptable for manufacture with integrated circuits.

Another object of this invention is to provide a mobile telephone system in which the timing functions can be carried out by digital-type circuits requiring a minimum number of capacitive and inductive components for their operation.

Another object of this invention is to provide an improved mobile telephone circuit system in which a plurality of tones generated by the system are derived from a single highly accurate oscillator.

In practicing this invention a mobile telephone system is provided which is capable of assuming a plurality of states. During each of the states separate operations are carried out by the system. The system transfers from one state to another in response to timing pulses and/or signals internally generated by the mobile telephone system and/or signals received from outside of the system. A single stable relatively high-frequency oscillator is used to generate an accurate signal which is divided down in frequency to develop the required output tone signals. A single timing oscillator generates pulses which are used to drive a counter to develop the timing pulses used by the system.

The invention is illustrated in the drawings of which:

DESCRIPTION OF THE INVENTION

Figure 1:
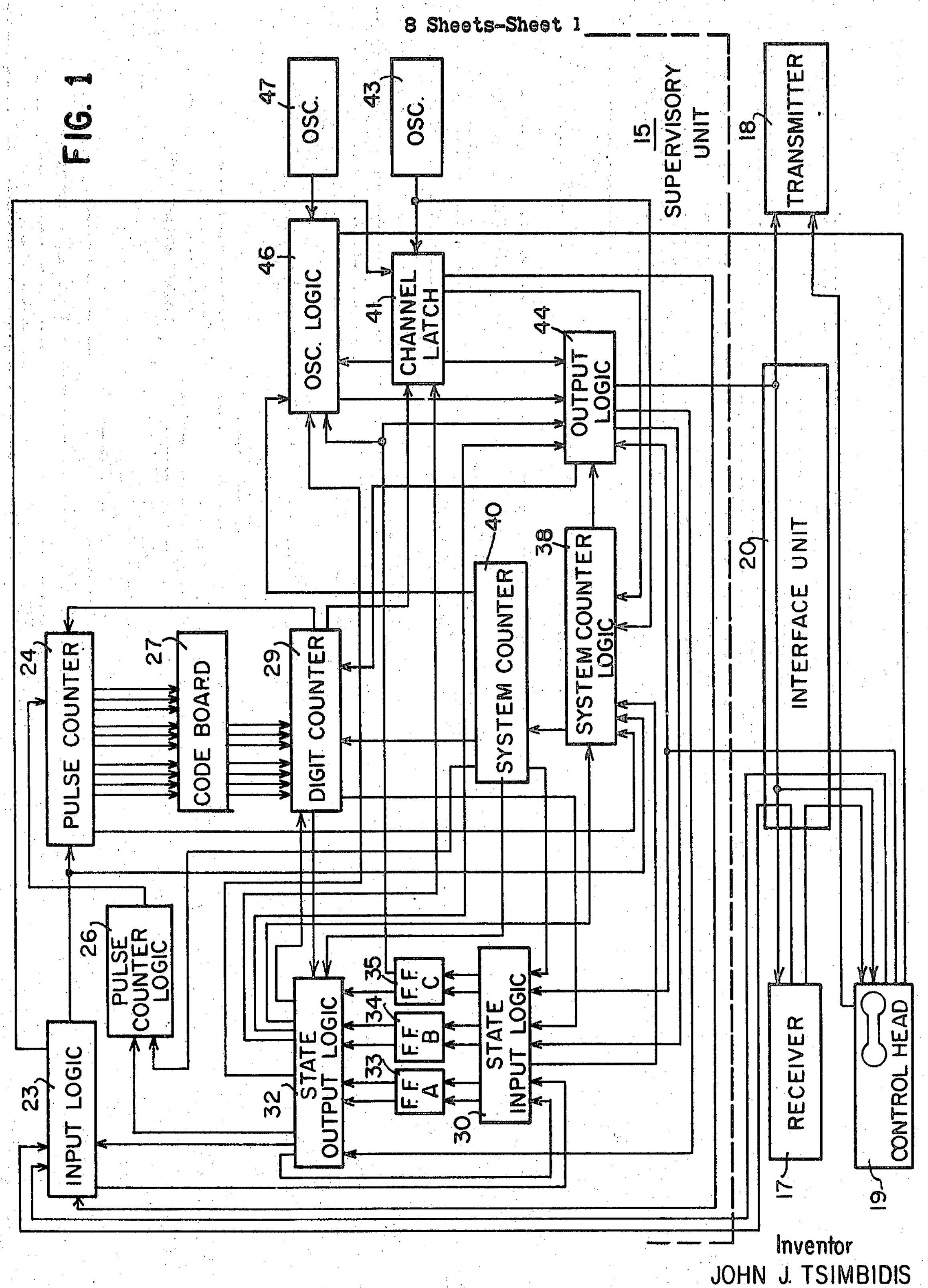
FIG. 1 is a block diagram of a supervisory unit for a mobile telephone system incorporating the features of this invention.

The supervisory system of the invention is used with two-way radio equipment to permit automatic dial operation from a mobile station to a base station and from the base station to the mobile station. The mobile receiver is represented in FIG. 1 by block 17 and the mobile transmitter is represented by block 18. Transmitter 18 and receiver 17 are coupled to supervisory unit 15 and control head 19 through interface unit 20.

Signals received by receiver 17 are in the form of tones modulating a carrier signal or voice transmission. Transmitter 18 transmits voice signals or tones generated by the supervisory unit 15. The system described is a multichannel system and may, for example, have 10 channels. The tones used by these systems may consist of idle and seize tones transmitted by the base station, and disconnect, connect and guard tones transmitted by the mobile station.

The radio system is a multichannel system with the mobile receiver being adapted to receive signals on a plurality of radio frequencies and the mobile transmitter being adapted to transmit signals on a plurality of radio frequencies. The base station transmitter applies a tone called the idle tone to mark one channel of the multichannel system. All receivers and transmitters in the system which are not being used for communication or signaling are tuned to this channel. When a receiver is not receiving the idle tone and is not being used for communication or signaling, the receiver searches through the channels for the idle tone. When the idle tone is received on one channel, the signal is applied to the receiver to stop the channel hunting action so that the receiver remains latched to the channel on which the idle tone is applied.

BASE STATION TO MOBILE CALL

Figure 2:
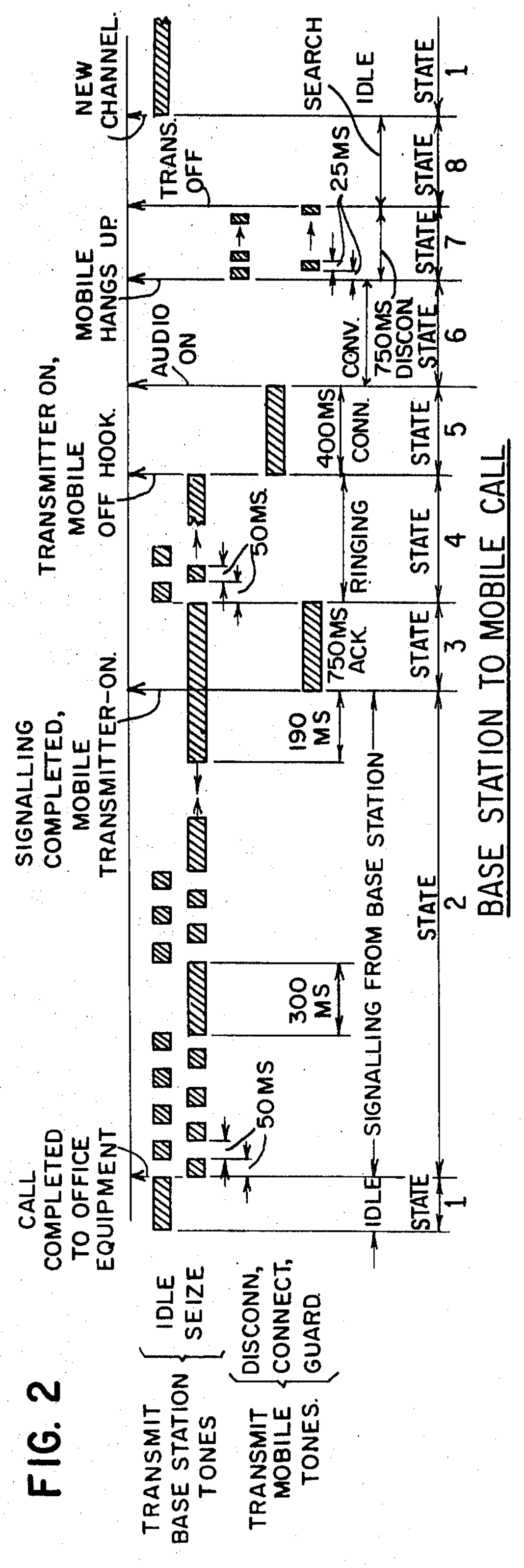
FIG. 2 is a sequence diagram showing the operation of the system when receiving a call from the base station.

In FIG. 2 a sequence chart for a base station to mobile call is shown. The operation of the system will be described referring to both FIGS. 1 and 2 interchangeably. The unit is initially in STATE 1 and is locked on the channel on which the continuous idle tone is received. Channel latch 41 has a latch output which causes the output logic circuit 44 to removed the search output and prevents the radio equipment from sequencing to the next channel. Pulse counter 24 and digit counter 29 are held in their reset position in STATE 1. Also FFA 33, FFB 34 and FFC 35 are in their reset position. FFA 33, FFB 34 and FFC 35 are flip-flop or bistable circuits which have set and reset positions, and flip-flops A, B and C and are the primary circuits for determining the STATE in which the supervisory system is placed at any particular time.

When the idle tone is removed and a seize tone is received (start of base to mobile call) state input logic 30 sets FFB 34 and the unit goes to STATE 2. In state 2 the supervisory system is conditioned to receive call signaling from the base station. For every transition from a seize tone to an idle tone, input logic circuit 23 provides a pulse counter clock pulse which is coupled to pulse counter 24 to advance the pulse counter. The pulse counter clock pulse is also coupled to system counter logic circuit 38 to reset the system counter. During the interval between digits the system counter is allowed to count up to 200 ms. to check for the proper digit, reset pulse counter 24, and advance digit counter 29 if the received digit is correct. Digit counter 29 advances one step for each digit which is received and counter 29 is connected through code board 27 to the correct stage of pulse counter 24 for each digit of the telephone number.

As shown in FIG. 2, at the end of the first digit a 300 ms. pause occurs during which no pulse counter pulses are received by pulse counter 24. At the end of a 200 ms. period a signal from system counter 40 causes digit counter 29 to check for the proper digit. If the received digit is correct digit counter 29 is advanced to the next digit and pulse counter 24 is reset. If the number of pulses received for a particular digit is not correct, digit counter 29 provides a mismatch signal which resets channel latch 41 to place the system in STATE 8. STATE 8 will be described in a subsequent portion of the specification. When all seven digits (the normal number of digits in a telephone number) are correctly decoded, digit counter 29 provides a match output which is coupled to state input logic 30 and state output logic 32 to place the system in STATE 3.

In STATE 3 an acknowledge signal, consisting of a tone called a guard tone, is transmitted to the base station for 750 ms. The guard tone is provided from oscillator 47 and oscillator logic 46. The output of oscillator 47 may be, for example, an 81.6 kHz. signal which is divided by 38, 50, or 61 to provide the 2150 Hz guard tone, the 1633 Hz connect tone, or the 1336 Hz disconnect tone. By using a single oscillator at a relatively high frequency and dividing down, it is possible to provide very accurate tone frequencies which can be easily crystal controlled. Previous systems use separate oscillators for each of the tone frequencies with the oscillators generating the tone frequency directly. It is difficult to provide inexpensive oscillators which are stable and accurate at the low tone frequencies so that the use of the single oscillator with a dividing circuit provides increased accuracy and reliability at less cost. At the end of the 750 ms. transmission period the guard tone stops, FFA 33 is set, which in turn resets FFB 34, and the system is placed in STATE 4.

In STATE 4 system counter 40 is initially set to 150 ms. and the counter is inhibited. When an idle tone is received the counter is reset by the pulse counter clock pulses to remove the inhibit signal. The inhibit signal is applied to control head 19 through output logic 44 and interface unit 20 and is used to gate off the ring signal. Thus when the inhibit signal is removed a ring signal will be developed by output logic 44 and coupled to control head 19 through interface unit 20. When a pulse counterclock pulse does not occur for 150 ms. the inhibit signal will be provided to stop the counter and remove the ring signal. STATE 4 continues until the subscriber lifts the handset on the control head 19 to answer the call or the base station stops transmitting the ring signal. When the subscriber lifts the handset on control head 19 to answer the call, a hook switch signal is sent to state input logic 30 to set FFC 35 to advance the unit to STATE 5.

In STATE 5 a connect signal generated by oscillator 47 and oscillator logic 46, as previously described, is transmitted to the base station for 400 ms. System counter 40 and system counter logic 38 are used to count the 400 ms. during which the connect signal from oscillator logic 46 is enabled. At the end of 400 ms. FFB 34 is again set to put the system in STATE 6 and an inhibit signal is provided to system counter logic 38 to stop the counting action of system counter 40.

With the system in STATE 6 the output logic circuit 44 provides handset enable and transmit signals to control head 19 and transmitter 18 respectively to allow the subscriber to converse with the calling party. STATE 6 lasts as long as the parties continue the call. When the subscriber hangs up, the hook switch signal is removed to cause state input logic 30 to reset FFB 34 and FFC 35 to place the system in STATE 7. When FFC 35 is reset state output logic 30 also resets pulse counter 24, digit counter 29 and system counter 40 to remove the match signal. In STATE 7 a disconnect signal is transmitted to the base station. The disconnect signal consists of alternate 25 ms. tone bursts of disconnect and guard tones which lasts for 750 ms. With the system in STATE 7, a transmit signal continues to be provided by output logic 44 to enable transmitter 18. At the end of the 750 ms. period the transmit signal is removed from transmitter 18 and FFA 33 is reset to place the system in STATE 8.

In state 8 channel latch 41 is initially in the reset condition. The absence of a latch signal from channel latch 41 in STATE 8 enables output logic circuit 44 to provide a search signal which is coupled to transmitter 18 and receiver 17 through interface unit 20. The search signal causes the transmitter and receiver to sequence through the channels in search of a new channel with a continuous idle tone. When 137.5 ms. of continuous idle tone is received, channel latch circuit 41 will provide a latch signal to place the system in STATE 1 again.

MOBILE TO BASE CALL AUTOMATIC OPERATION

Figure 3:
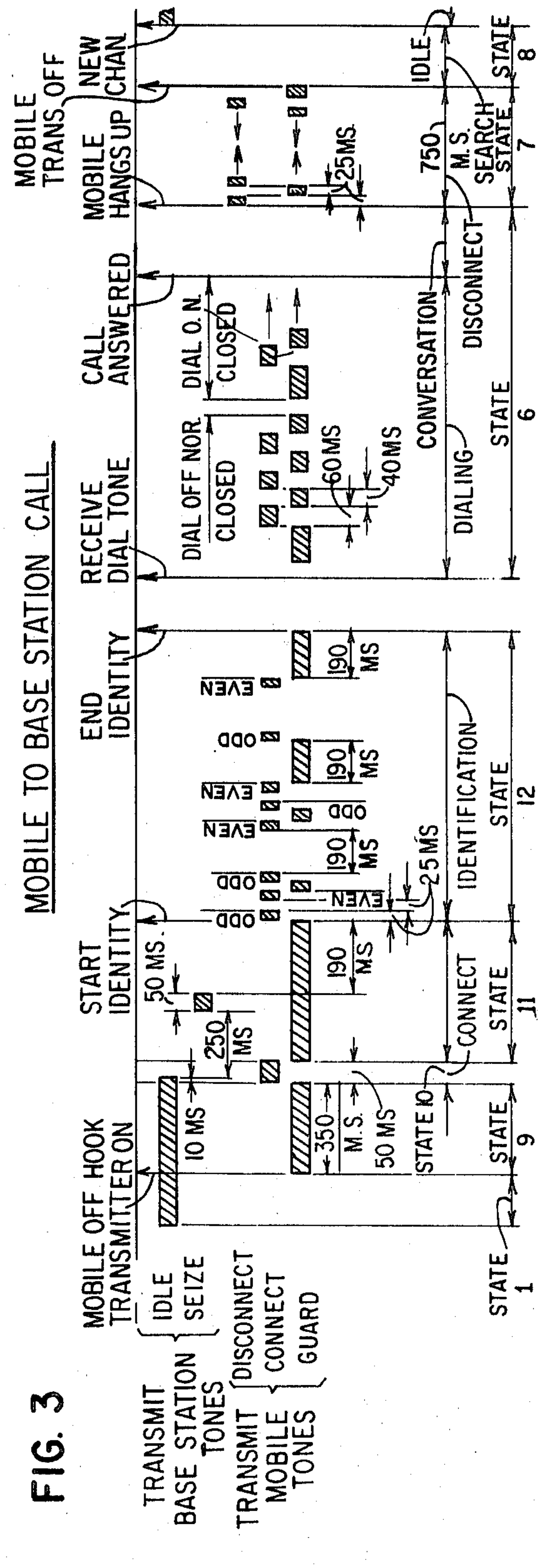
FIG. 3 is a sequence diagram showing the operation of the system when placing a call from the mobile system to a base station.

Referring to FIG. 3 there is shown a sequence diagram illustrating the operation of the mobile supervisory unit when making a mobile to base station call. Initially, the supervisory unit is locked on the channel on which the continuous idle tone is received. This condition is STATE 1 as previously described. When the subscriber removes the handset from the cradle a hook switch signal sets FFC 35 to place the unit in STATE 9.

In STATE 9 a guard tone is transmitted to the base station for 350 ms. System counter 40 is used to count the 350 ms. period during which the guard tone from oscillator 47 and oscillator logic circuit 46 is enabled. During STATE 9 output logic circuit 44 provides a transmit signal to transmitter 18. When the system counter reaches a count of 350 ms., the unit is in STATE 10.

In STATE 10 the guard tone is stopped and the connect tone is transmitted for 50 ms. The 50 ms. period is timed by system counter 40 continuing its count up to 400 ms. When system counter 40 reaches a count of 400 ms., FFA 33 is set to place the unit in STATE 11.

In STATE 11 system counter 40 is initially set to 400 ms. and an inhibit signal prevents it from counting further. Oscillator logic circuit 46 and oscillator 47 provide a guard tone and output logic circuit 44 continues to provide a transmit signal. When a seize tone is received from the base station, system counter 40 is reset to remove the inhibit signal. While a seize tone is being received in this STATE system counter 40 is held reset. When the seize tone is removed and when the counter reaches a count of 200 milliseconds the state input logic circuit 30 sets FFB 34 to place the unit in STATE 12.

In STATE 12 the mobile station identification signal is transmitted to the base station. System counter 40 is initially held reset by the PCo signal from the pulse counter 24. An astable signal from channel latch 41 is used to generate clock pulses for advancing pulse counter 24 until the count for the first digit is reached. At this time digit counter 29 provides a SEMI (semimatched) signal which is used in channel latch circuit 41 to inhibit the channel latch signal which generates the astable clock pulses. When the PCo signal is removed by the first pulse counter clock pulse, the inhibit on system counter 40 was also removed. However, system counter 40 is still reset with every pulse counter clock pulse. With the astable flip-flop inhibited system counter 40 is allowed to count up to 200 ms., advance digit counter 29 and reset pulse counter 24. System counter 40 is then inhibited by the PCo signal and the removal of the SEMI signal enables the astable flip-flop. Astable and parity signals from channel latch 41 are used to gate the connect and guard tones from oscillator 47 and oscillator logic 46. This action continues until the seventh digit is transmitted and a MATCH signal provided to put the system in STATE 6.

The operation is then identical to the operation following STATE 6 of the base to mobile sequence previously described except that a number must be dialed by the subscriber to initiate the call. A dial tone is transmitted by the base station and when the subscriber dials the number, the dial off normal contacts and the dial pulse signals are used by the oscillator circuits to enable the connect and guard tones. The dial off normal signal is used by output logic 44 to remove the handset enable signal when the dial off normal signal is present.

After dialing the conversation, which occurs during STATE 6, the mobile subscriber hangs up setting the supervisory unit to STATE 7. In STATE 7 alternate 25 ms. disconnect and guard pulses are transmitted, as previously described, for 750 ms., at the end of which time the transmitter 18 is turned off and the supervisory unit switches to STATE 8. During STATE 8 supervisory unit 15 sends a search signal to transmitter 18 and receiver 19 to sequence receiver 19 and transmitter 18 through all of the channels until a channel is found carrying an idle tone. Upon receipt of the idle tone the system switches to STATE 1 as previously described.

MANUAL MODE OF OPERATION

In the manual mode of operation FFA 33 is held reset and FFB 34 is clamped set. Thus A STATE 2 signal is always present which enables pulse counter 24 and digit counter 29 so that signaling from the base station is always accepted. When a MATCH condition is reached, A STATE 4 signal is also provided to enable the ring output. STATE 6 and STATE 10 will also have an output in the manual mode but they will not affect the operation of the unit.

CIRCUIT DESCRIPTION

Figure 4:
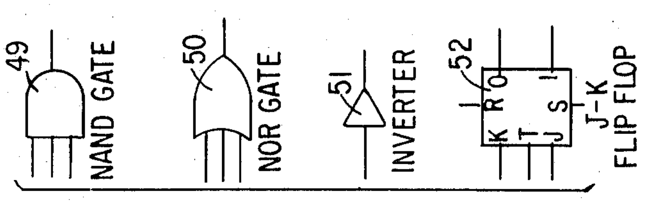

In FIG. 4 there is shown the designations given the various logic blocks in FIGS. 5—13. Block 49 represents a NAND gate, block 50 represents NOR gate, block 51 represents an inverter and block 52 a J—K flip-flop.

Figure 5:
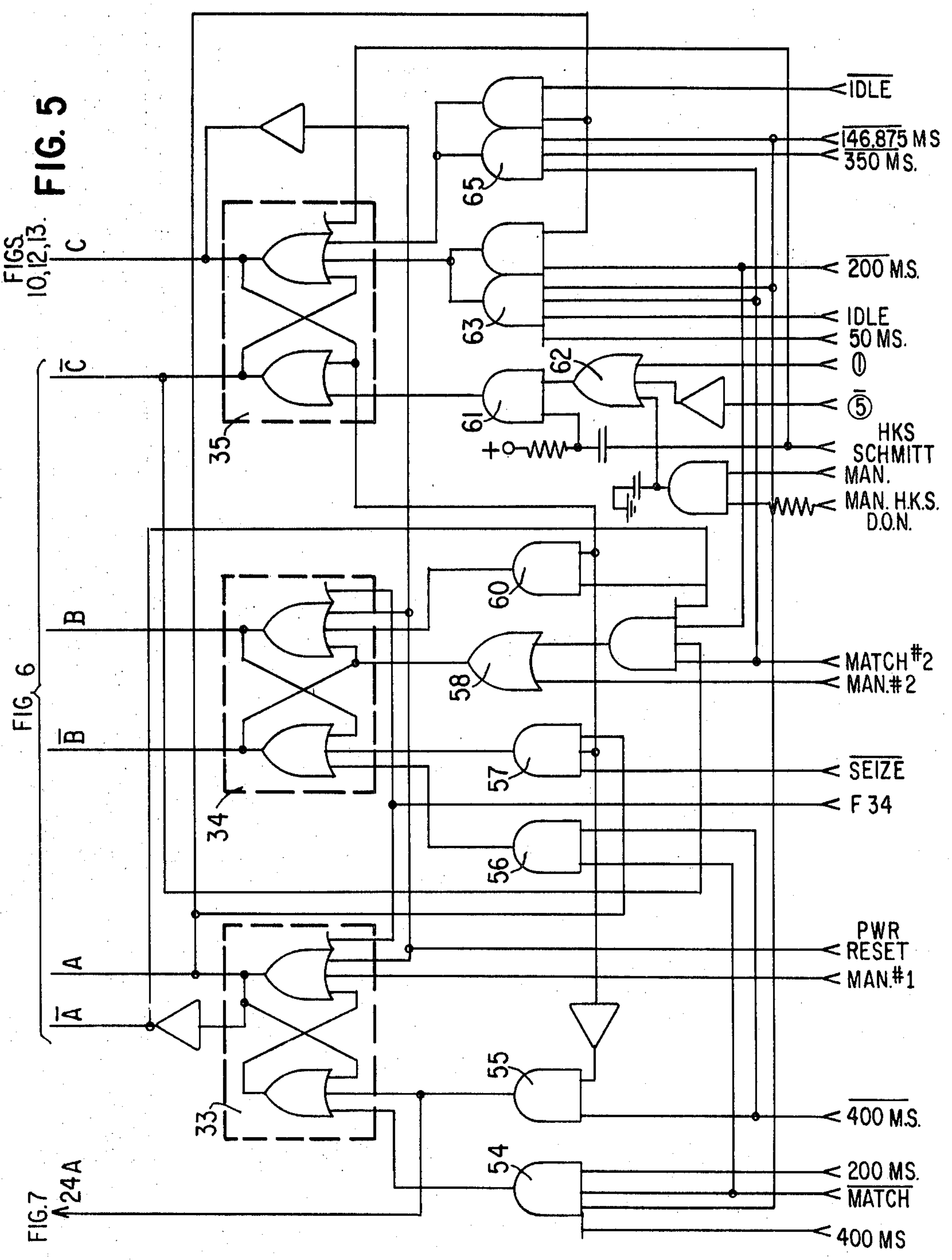
FIGS. 4 to 13 are logic diagrams showing the circuits of the blocks to FIG. 1.
Figures 6, 9:
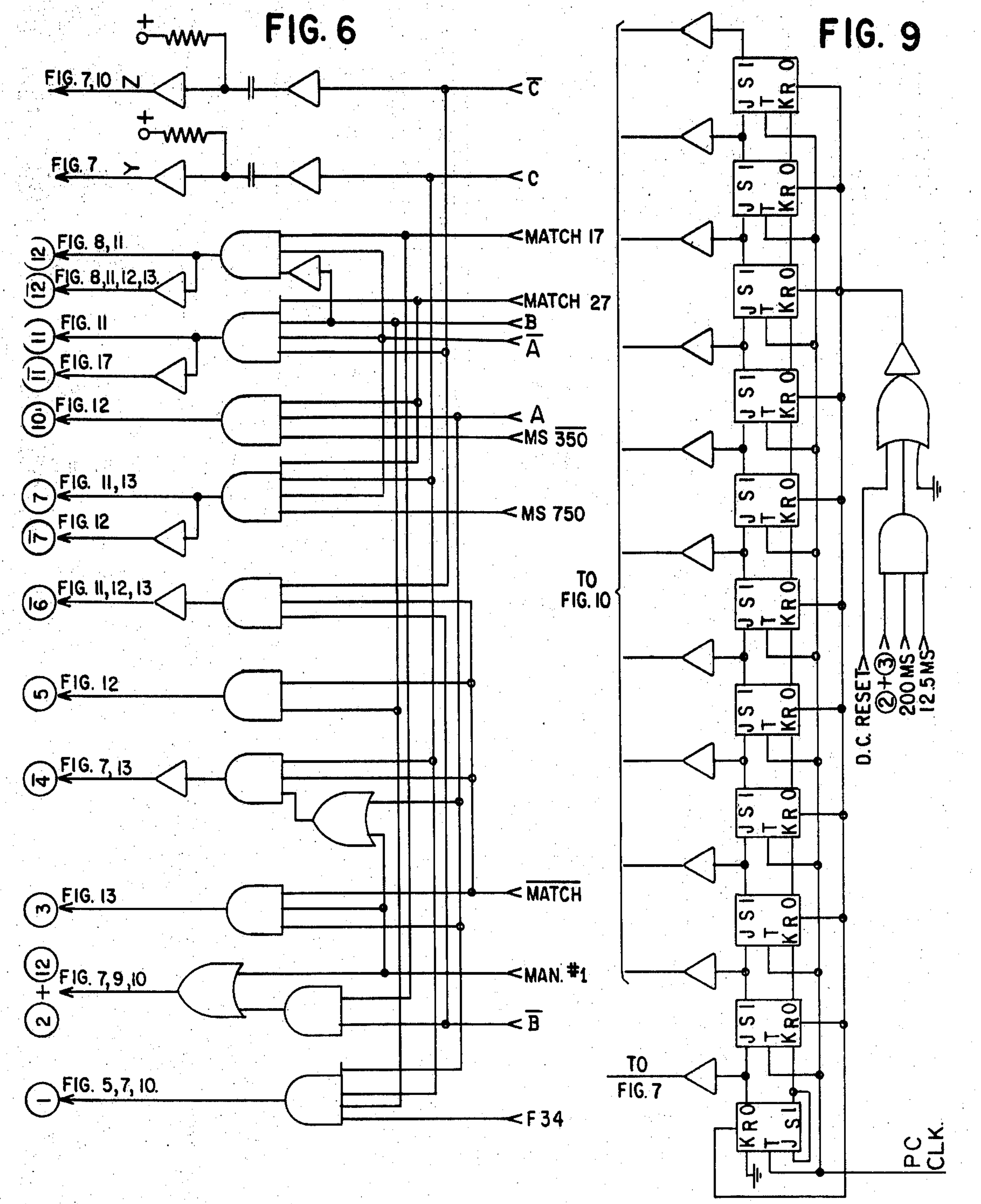

In FIG. 5 there is shown the logic diagram for state input logic 30 and FFA 33, FFB 34, and FFC 35 of FIG. 1 and in FIG. 6 there is shown the logic diagram for state output logic 37. The outputs of FFA 33, FFB 34, FFC 35 and the state output logic 37 together with the match signal of digit counter 29, the latch signal from channel latch 41 and the condition of the system counter logic 38 determines which of the 12 STATES the system is in. FFA 33 can be set by outputs from AND gates 54 or 55. Gate 54 will have an output when system counter 38 reaches a count of 146.875 milliseconds and a MATCH condition exists. Gate 55 will have an output when FFC 35 is set and a count of 400 ms. is reached by system counter 40. FFA is thus set by gate 55 at the end of STATE 10. Gate 55 is also used to inhibit system counter 40 when this condition exists during STATES 6 and 11. FFA 33 is reset by the F34 and power reset signals and is clamped reset in the manual mode of operation.

FFB 34 is set by the output of AND gates 56 and 57, and OR gate 58. Gate 56 sets FFB 34 at the end of STATE 5 when a count of 400 milliseconds is reached by system counter 40 while a MATCH condition exists. Gate 57 sets FFB 34 at the beginning of STATE 2 when FFA 33 and FFC 35 are both reset and a seize signal is received. FFB 34 is reset by the F34 and power reset signals and when FFA 33 is set while FFC 35 is reset which causes NAND gate 60 to have an output.

FFC 35 is an interface between the hook switch and the state output logic 37. It is set by NAND gate 61 which has an output when the HKS Schmitt signal (generated in the interface unit 20 of FIG. 1) goes positive while NOR gate 62 has an output. This occurs during STATES 1 and 4 or in the manual mode when the push-to-talk button is depressed after the handset is removed. FFC 35 is clamped reset when the HKS Schmitt signal goes positive. It is also reset by the power reset signal and by NAND gates 63 and 65. NAND gate 63 will have an output at the end of STATE 9 if an idle tone is not present, and NAND gate 65 will have an output at the end of state 10 if the idle tone is present.

In FIG 6 there is shown the state output logic 32 of FIG. 1. The circled numbers at the output represent the STATE output signals which indicate which STATE the system is in. The gate for STATE 5 also has an output during STATE 4 but it is only used to change the frequency of the output tone and the transmitter is not on during STATE 4. The circuits associated with outputs Y and Z generate narrow positive pulses when FFC 35 is reset and set respectively.

Figure 7:
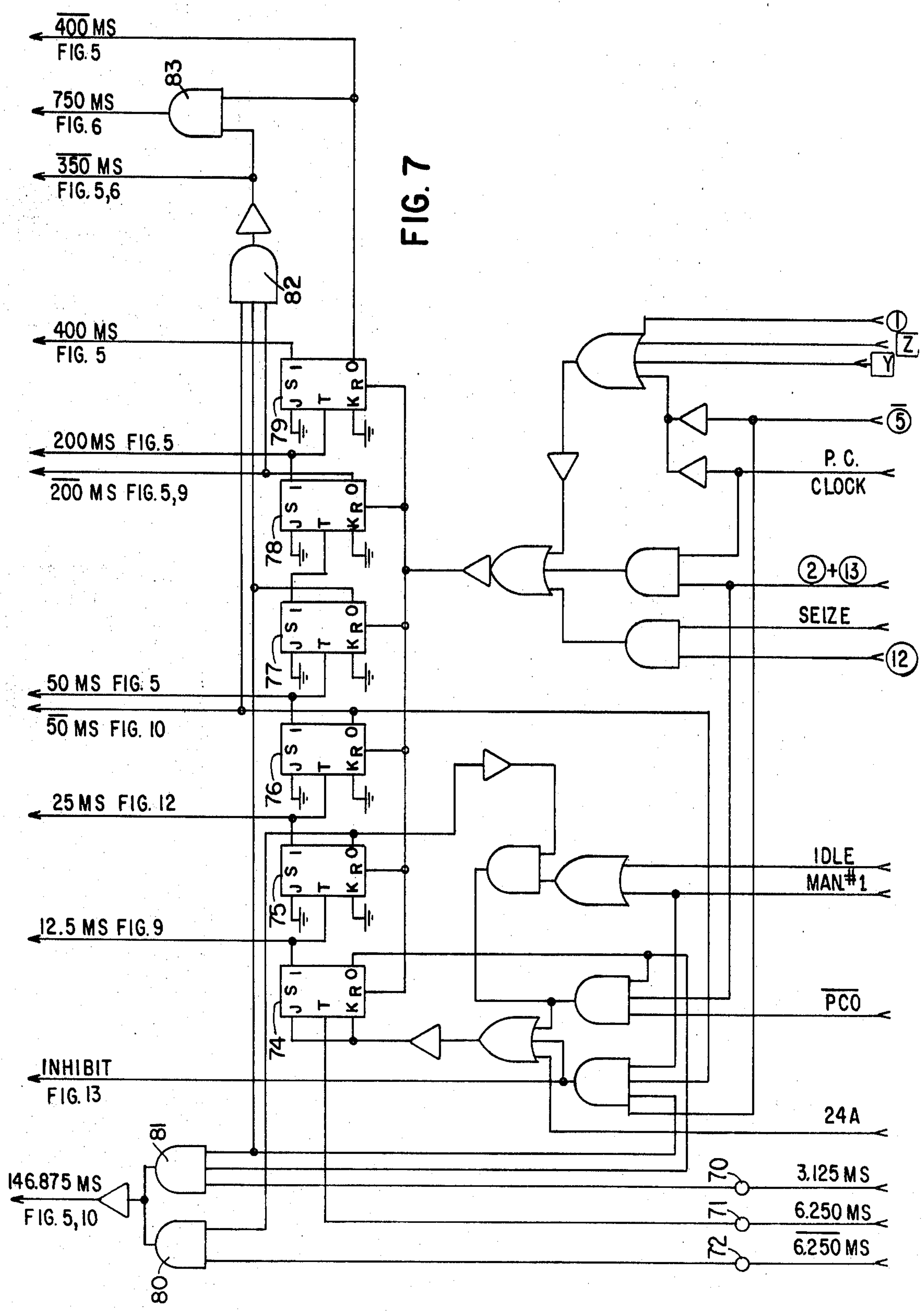

In FIG. 7 there is shown a logic diagram for the system counter logic 38 and system counter 40. Timing pulses for the counter are received from oscillator 43 in FIG. 1. Oscillator 43 may be an astable oscillator developing pulses having a period of, for example, 6.250 milliseconds. By proper connections to the astable oscillator 43 6.250 millisecond timing pulses are coupled to lines 71 and 72. 3.125 millisecond pulses can also be derived from the astable oscillator and coupled to line 70.

The J—K flip-flops shown in the logic diagram FIG. 7 are connected to perform a toggle operation with a maximum count of 800 milliseconds. They are used to provide the following time intervals for the system.

200 millisecond interdigit time 750 millisecond acknowledge interval 400 millisecond connect interval 350 millisecond connect delay 50 millisecond connect 750 millisecond disconnect interval The J—K flip-flops 74—79 together with AND gates 80—83 act as a binary counter to develop the various time intervals required by the system. The counter is reset at the beginning of a time interval and allowed to count up to the desired time interval by taking the output from the proper terminal. By this means the timing circuitry uses a single reference element which can be made very stable. The timing circuitry also uses digital counting type circuitry which is especially adapted to be implemented by integrated circuits and does not require the inductors and capacitors normally required by oscillator timing circuits.

Figure 8:
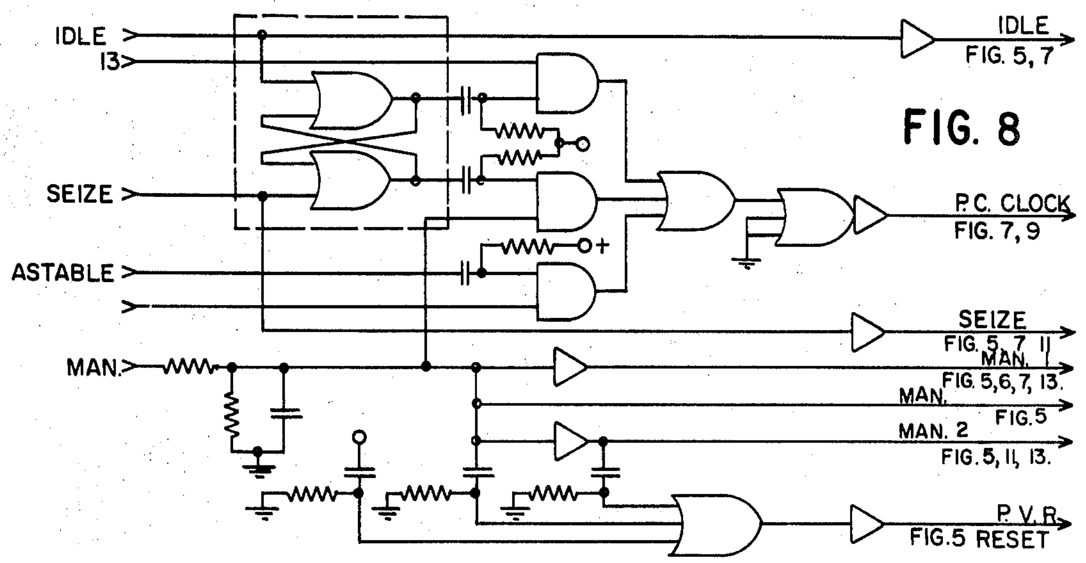

Input logic circuit 23 is shown in FIG. 8. It acts to develop the pulse counter clock pulses. Input logic circuit 23 also provides manual signals and power reset signals to the system as well as the seize and idle signals. In FIG. 9 there is shown pulse counter 24 of FIG. 1. The pulse counter consists primarily of J—K flip-flops set for shift operation to count incoming pulses and to develop an output on the line corresponding to the number of input pulses received. FIG. 9 also includes the pulse counter logic 26 of FIG. 1. The 11 stage counter develops an output from only one of the 11 outputs shown at any one time.

Figure 10:
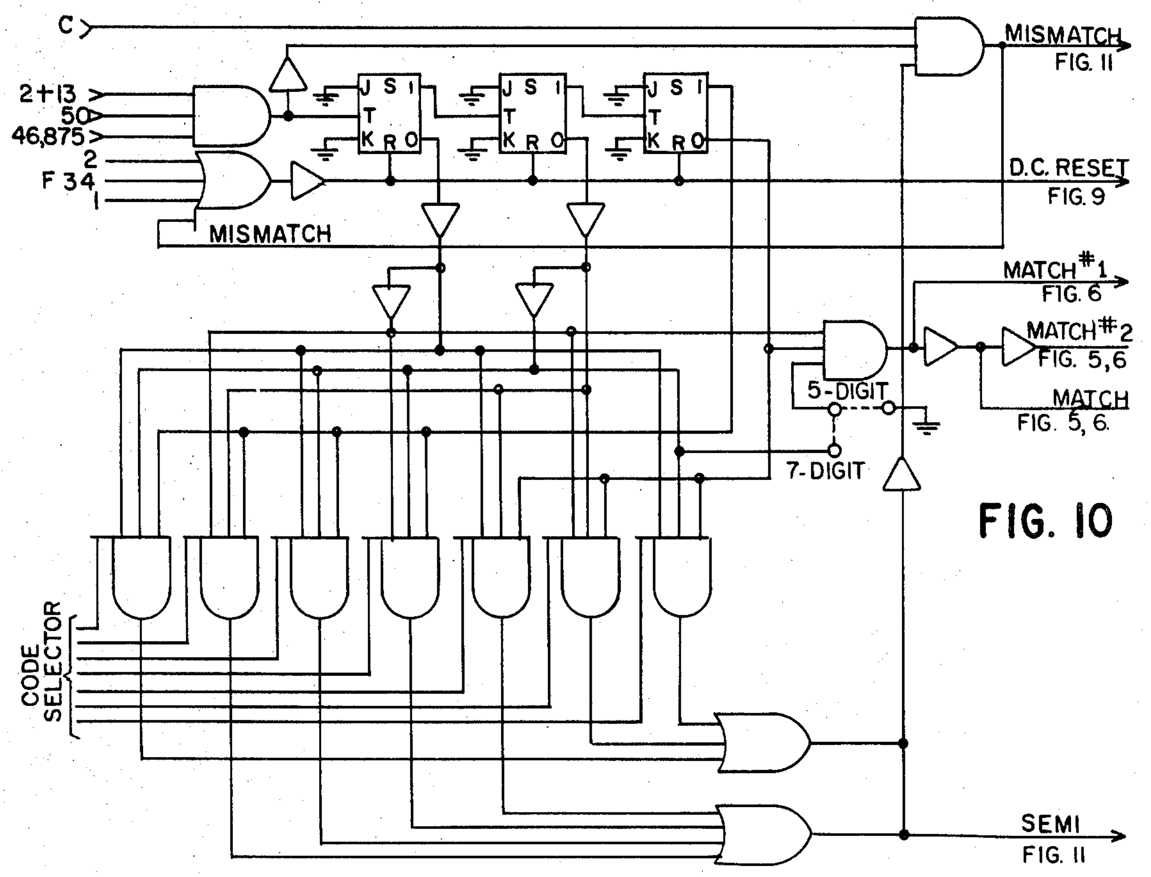
Figure 11:
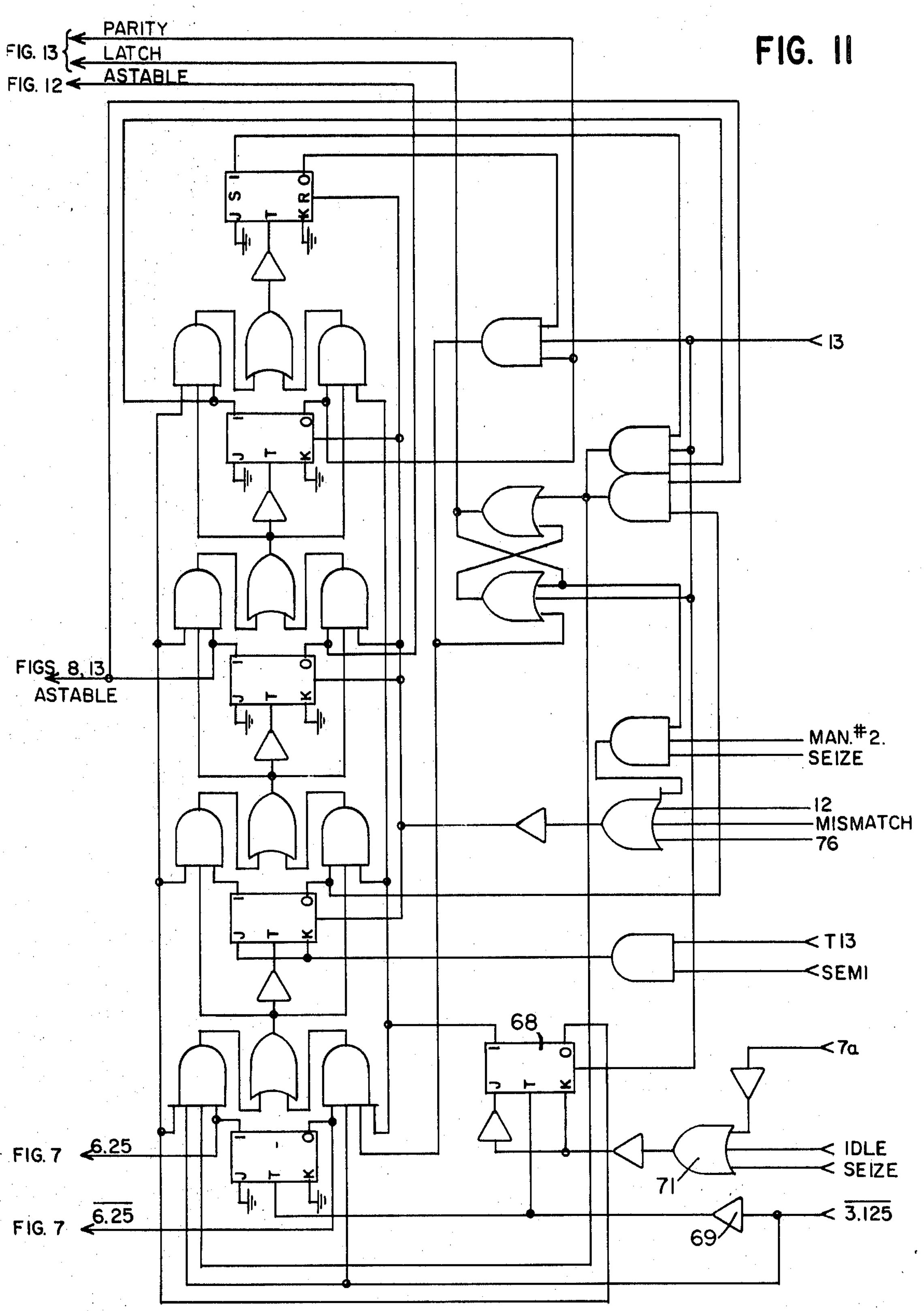

In FIG. 10 there is shown the digit counter 29 of FIG. 1. The digit counter includes a three stage counter to tally the number of digits that have been transmitted or received. Seven 4 input NAND gates compare the number in the pulse counter with the proper code to produce the MATCH, MISMATCH and SEMI (semimatch) signals. In FIG. 11 there is shown the channel latch circuit 41 of FIG. 1. Channel latch 41 is basically an up-down counter driven by a square wave with a period of 6.25 milliseconds. The square wave is derived from oscillator 43 which develops an output signal having a frequency of 160 Hz. The condition of flip-flop 68 determines whether the counter will count up or down. Flip-flop 68 is triggered when the 3.125 millisecond output of inverter 69 has a negative transition and is controlled by the NOR gate 71.

Figure 12:
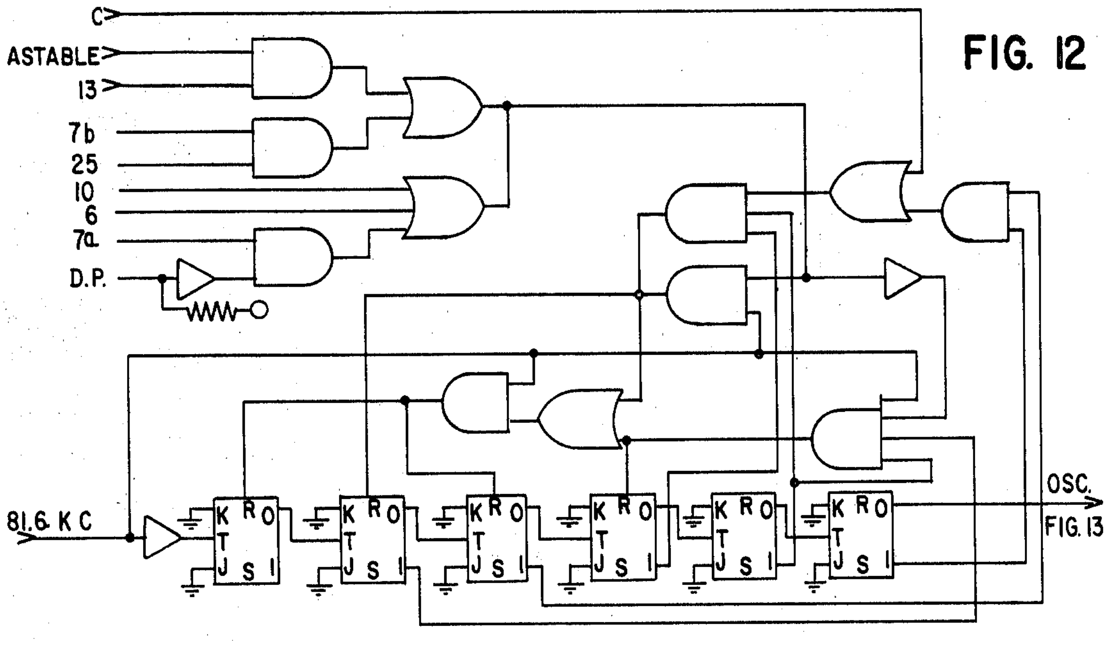
Figure 13:
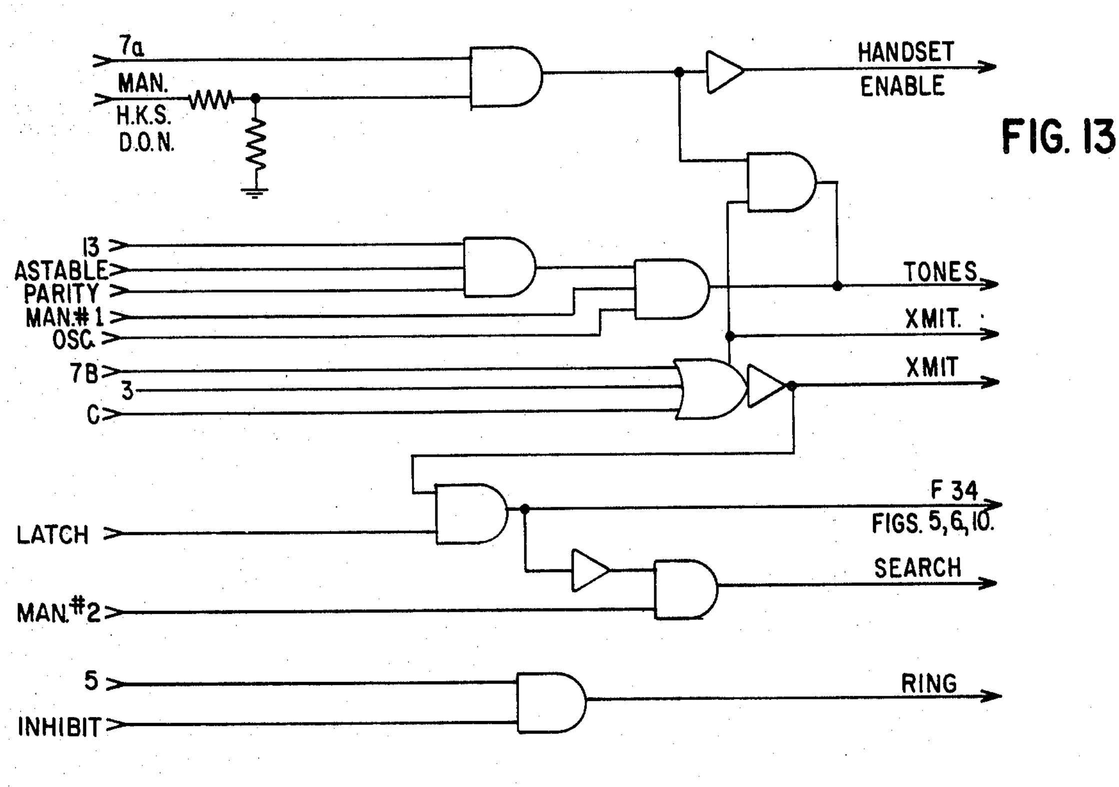

Oscillator logic 46 is shown in FIG. 12. The input to oscillator logic circuit 46 is an 81.6 kHz. signal which is divided down to develop approximately the 2147 Hz., 1632 Hz and 1338 Hz tones required for signalling to the base station. This is accomplished by dividing the output of the 81.6 kHz. oscillator by 38, 50 and 61 respectively. The output logic 44 of FIG. 1 is shown in FIG. 13. The output logic circuits shown in FIG. 13 provide part of the logic required for output signals of the system. Examples of these signals are HANDSET ENABLE, TONES, TRANSMIT, SEARCH and RING signals. An F34 signal is also provided which is used by other portions of the supervisory unit for control.

Thus a supervisory system for a mobile radiotelephone has been described. The system, including the timing circuits, uses digital type logic circuitry which is especially adapted to be implemented by integrated circuits. The use of integrated circuits permits a decrease in the size, cost and complexity of the unit. Since the telephone system is designed to be carried in vehicles, the reduction in size and complexity is especially important.

I claim:

1. Mobile radiotelephone apparatus for communication to a particular land telephone through radio equipment at a base station including in combination, a mobile transmitter, a mobile receiver adapted to receive signals from the base station and to develop a plurality of first control signals therefrom, control means coupled to said mobile receiver and adapted to develop a second plurality of control signals, supervisory means coupled to said receiver and to said control means for controlling the operation of the mobile radio telephone apparatus, said supervisory means having a plurality of discrete operating states for establishing a communication path between the mobile radio telephone apparatus and the particular telephone, said supervisory means including first, second and third bistable circuits each having set and reset positions for providing said operating states and timing means for providing a plurality of timing signals at predetermined time intervals, said first bistable circuit being set in response to one of said first control signals so that said supervisory means switches from a first state to a second state for holding the mobile radiotelephone apparatus in condition for receiving signals from the base station, said second bistable circuit being set and said first bistable circuit being reset in response to particular ones of said first control signals and to a timing signal so that said supervisory means conditions the mobile radiotelephone apparatus for ringing action, said third bistable circuit being set in response to one of said second control signals so that said supervisory means applies a connect tone signal to the transmitter for transmission to the base station, and said first bistable circuit being set in response to a timing signal after transmission of said connect signal to place the supervisory unit in a state causing the mobile radio telephone apparatus to be operative for voice communication.

2. Mobile radiotelephone apparatus in accordance with claim 1 wherein said supervisory means includes decoder means operative during the second state and responsive to first control signals representing a particular address to cause the supervisory means to provide an acknowledge tone signal and applying the same to said mobile transmitter for transmission to the base station.

3. Mobile radio telephone apparatus in accordance with claim 1 wherein said control means includes a handset and hook switch means for providing said one second control signal for operating said third bistable circuit in response to removal of the handset.

4. Mobile radio telephone apparatus in accordance with claim 3 wherein said control means removes said one second control signal in response to hangup of the handset and said first and third bistable circuits are reset thereby to cause said supervisory means to apply a disconnect tone signal to said mobile transmitter.

5. Mobile telephone apparatus in accordance with claim 4 wherein said second bistable circuit is reset by a timing signal after transmission of the disconnect tone signal so that said supervisory means conditions the mobile radio telephone apparatus for a subsequent operation.

6. Mobile radio telephone apparatus in accordance with claim 1 wherein said control means includes a handset and hook switch means for providing one second control signal in response to removal of said handset, and said third bistable circuit is set by said one second control signal and operates with said first and second bistable circuits reset to apply a call tone signal to said mobile transmitter for transmission to said base station to initiate a call, and said timing means provides a timing signal to terminate the transmission of said call signal 7. The mobile radiotelephone apparatus in accordance with claim 6 wherein said supervisory means includes means operating in response to said timing signals to apply a connect tone signal to said mobile transmitter for transmission to the base station for a predetermined time following transmission of said call tone signal, and wherein said second bistable circuit is responsive to said timing signals to cause said supervisory unit to apply said call tone signal to said mobile transmitter for a further time period.

8. Mobile radio telephone apparatus in accordance with claim 7 wherein said supervisory unit includes means for applying tone signals to said mobile transmitter for transmission to the base station for identifying the particular mobile radiotelephone apparatus, and said first bistable circuit responds to a further first control signal produced by a signal received from the base station by said mobile receiver to cause operation of such means.

9. The mobile radiotelephone apparatus of claim 1 wherein said timing means includes first oscillator means for generating a series of first time signal pulses of a particular duration, and counting means coupled to said first oscillatory means for counting said first time signal pulses, said counting means having a plurality of outputs for developing a plurality of output timing pulses of different durations which are integral multiples of said particular duration, said first time signal pulses and said plurality of output timing pulses forming said plurality of timing signals.

10. The mobile radio telephone apparatus of claim 9 wherein said supervisory means includes second oscillator means for developing tone signals of a fixed frequency, and a plurality of divider circuit means coupled to said second oscillator means, each of said divider circuit means being operative to divide said tone signals in frequency to develop a plurality of tone signals for transmission by said mobile transmitter.